(12) United States Patent
Thorvaldsson

(10) Patent No.: US 8,330,433 B2
(45) Date of Patent: Dec. 11, 2012

(54) CONTROL DEVICE REACTIVE POWER COMPENSATOR AND METHOD

(75) Inventor: Björn Thorvaldsson, Kolbäck (SE)

(73) Assignee: ABB Technology AG, Switzerland (CH)

( * ) Notice: Subject to any disclaimer, the term of this patent is extended or adjusted under 35 U.S.C. 154(b) by 0 days.

(21) Appl. No.: 13/229,335

(22) Filed: Sep. 9, 2011

(65) Prior Publication Data

US 2011/0316492 A1 Dec. 29, 2011

Related U.S. Application Data

(63) Continuation of application No. PCT/EP2009/052743, filed on Mar. 9, 2009.

(51) Int. Cl.
*G05F 1/70* (2006.01)

(52) U.S. Cl. ........................................ 323/205

(58) Field of Classification Search ........... 323/205–211
See application file for complete search history.

(56) References Cited

U.S. PATENT DOCUMENTS

| | | | |
|---|---|---|---|
| 4,121,150 A | | 10/1978 | Kelley, Jr. |
| 4,204,151 A | * | 5/1980 | Gyugyi et al. ............... 323/210 |
| 4,897,593 A | | 1/1990 | Konishi et al. |
| 5,099,190 A | * | 3/1992 | Sato ............................ 323/210 |
| 5,621,305 A | * | 4/1997 | Clark et al. .................. 323/210 |
| 6,242,895 B1 | * | 6/2001 | Fujii et al. ................... 323/207 |
| 6,693,409 B2 | * | 2/2004 | Lynch et al. ................. 323/208 |

FOREIGN PATENT DOCUMENTS

EP 0438059 A2 7/1991

OTHER PUBLICATIONS

International Preliminary Report in Patentability; Application No. PCT/EP2009/052743; Issued: Jul. 8, 2011; 15 pages.
International Search Report and Written Opinion of the International Searching Authority; Application No. PCT/EP2009/052743; Issued: Dec. 8, 2009; 13 pages.

* cited by examiner

*Primary Examiner* — Jessica Han
(74) *Attorney, Agent, or Firm* — St. Onge Steward Johnston & Reens LLC

(57) ABSTRACT

A control device for controlling a reactive power compensator connected to an electric power network and arranged to provide reactive power to the electric power network. The control device includes a voltage regulator outputting a control signal to the reactive power compensator for controlling its supply of susceptance to the electric power network. The control device includes a gain-adjusting device arranged to adjust the gain of the voltage regulator relative to the point of operation of the reactive power compensator.

10 Claims, 3 Drawing Sheets

CONTROL DEVICE REACTIVE POWER COMPENSATOR AND METHOD

CROSS-REFERENCE TO RELATED APPLICATIONS

The present application is a continuation of pending International patent application PCT/EP2009/052743 filed on Mar. 9, 2009 which designates the United States and the content of which is incorporated herein by reference.

FIELD OF THE INVENTION

The present invention relates to the field of reactive power control, and in particular to methods and means for improving regulation of a reactive power compensator, such as a Static VAr Compensator, of a power network.

BACKGROUND OF THE INVENTION

Reactive power control can be used to optimize reactive power flow within an electric power network, denoted power network in the following. A Static VAR (Volt-Ampere Reactive) Compensator (SVC) is a device frequently used within such power networks for combating disturbances within the network by means of reactive power. The SVC counteracts voltage drops in the power network by providing reactive power and is often able to handle overvoltages by absorbing reactive power. In short, the SVC works to maintain the voltage of the power system by adjusting the reactive power flow, as the reactive power is a great factor of voltage fluctuations in the power network.

To this end, the typical SVC comprises a bank of thyristor-switched capacitors, harmonic filters and thyristor-controlled inductive elements, also denoted reactors. These components of the SVC are controlled so as to provide the desired reactive power. In particular, if the power network's reactive demand is capacitive (leading) the SVC uses the reactors to consume VARs from the network, thereby lowering the system voltage. If the power network's reactive demand is inductive (lagging) the capacitor banks are used for supplying VARs to the power network, thereby increasing the power network voltage.

The SVC comprises a control system for controlling the above-described functions. The control system is most often of a PI (proportional-integral) type, or just of I-regulator type. A voltage in the power network is measured at some point by means of a suitable voltage-detecting device. The measured voltage is compared to a set reference voltage, and the control system outputs a reactive power control signal commanding the SVC to provide or absorb reactive power in dependence on the power network need, which, somewhat simplified, is determined in dependence on the difference between the measured voltage and the set reference voltage.

SUMMARY OF THE INVENTION

The effect of the SVC on the power network voltage is the voltage share between the power network impedance and the SVC admittance, which is a non-linear relation. The network voltage sensitivity can be defined as voltage variation due to SVC admittance variation. The voltage sensitivity to a change in admittance increases significantly when the product of the power network impedance Z and SVC admittance Y increases. Most SVC installations have a product Z*Y within the range of 0.05 to 0.1. For Z*Y within this range, the voltage sensitivity can be considered constant and thereby totally determined by the network impedance Z. However, recently some SVCs have become larger and this simplification is no longer valid.

In view of the above, it is an object of the invention to provide a control device for controlling a reactive power compensator of a power network, wherein the above shortcomings are overcome or at least alleviated.

It is a particular object of the invention to provide a control device for controlling a reactive power compensator of a power network, having a control speed that is independent of the point of operation of the reactive power compensator.

This object, among others, is achieved by a control device for controlling a reactive power compensator of a power network, as claimed in the independent claims.

In accordance with the invention, a control device for controlling a reactive power compensator connected to an electric power network is provided. The reactive power compensator is arranged to provide reactive power to the electric power network. The control device comprises a voltage regulator that outputs a control signal to the reactive power compensator for controlling its susceptance to the electric power network. The control device is characterized by that it comprises a gain-adjusting device arranged to adjust the gain of the voltage regulator relative to the point of operation of the reactive power compensator. The control device in accordance with the invention has a constant control speed irrespective of the point of operation of the reactive power compensator and for some cases even irrespective of power network strength. By means of the invention, a stable and fast control performance is thus provided.

In accordance with an embodiment of the invention, the gain-adjusting device is arranged to adjust the gain of the voltage regulator by multiplying the gain of the reactive power compensator with an adjustment term derived from an equation for a gain of the electric power network. In accordance with another embodiment of the invention, this is performed in every regulation cycle performed by the control device. The control speed is thereby constant irrespective of point of operation of the reactive power compensator.

In accordance with still another embodiment of the invention, the gain of the electric power network is calculated by means of the equation:

$$\frac{dV_{SVC}}{dB_{SVC}} = \frac{X_{net}}{(1 + X_{net}B_{SVC})^2} V_{net}$$

wherein $X_{net}$ is the reactance of the electric power network seen as a Thevenin equivalent, $V_{SVC}$ is a voltage at the terminals of the reactive power compensator, $V_{net}$ is the power network voltage seen as a Thevenin equivalent and $B_{SVC}$ is the susceptance of the reactive power compensator. In accordance with yet another embodiment of the invention, the gain-adjusting device is arranged to adjust the gain of the voltage regulator by multiplying the above equation by $(1+X_{net}B_{SVC})^2$. This provides a constant response irrespective of point of operation of the reactive power compensator.

The invention also relates to a corresponding method, a reactive power compensator, and computer program products whereby advantages corresponding to the above are achieved.

Further features and advantages will become clear upon reading the following description together with the appended figures.

DETAILED DESCRIPTION OF THE INVENTION

Figure 1:
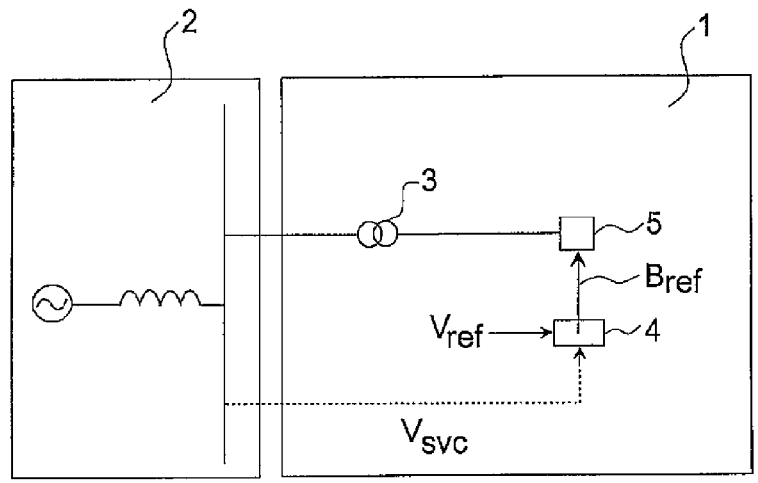
FIG. 1 illustrates schematically an SVC in accordance with the present invention.

FIG. 1 illustrates schematically a reactive power compensator in accordance with the present invention, in the following exemplified by an SVC 1. The SVC 1 is connected to a power network 2, most often via a power transformer 3 being a part of the SVC 1. It is noted that in some cases, there is no need for the power transformer 3. In line with the prior art SVC described in the introductory part, the SVC 1 comprises a device 5 for providing variable inductive and capacitive susceptance. The device 5 may for example comprise, among other components, a bank of thyristor-switched capacitors, harmonic filters and thyristor-controlled reactors.

The SVC 1 further comprises a control device 4 for regulating the suspectance input to the power network 2. Briefly, the control device 4 outputs a control signal $B_{ref}$ based on a set reference voltage $V_{ref}$ of the power network 2 and an actual voltage $V_{SVC}$ measured in the power network 2, the measured voltage being provided by means of any suitable voltage-detecting device (indicated by a dashed line in the FIG. 1), for example a potential transformer. The reactive power output from the SVC 1 is then set in dependence on the difference between the measured voltage $V_{SVC}$ and the set reference voltage $V_{ref}$ in an effort to eliminate the difference.

Figure 2:
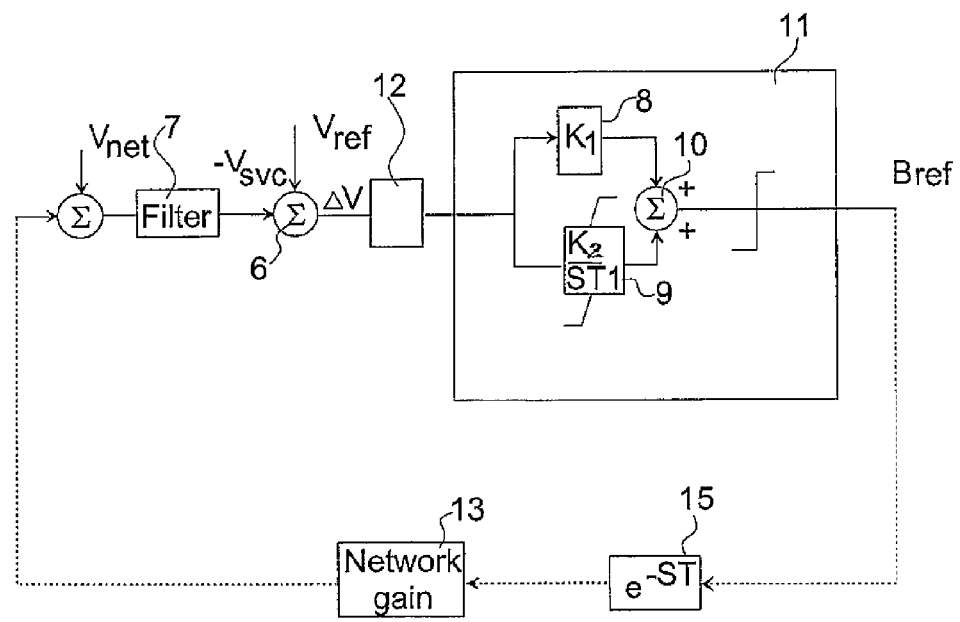
FIG. 2 illustrates the control device of the SVC of FIG. 1 in more detail.

FIG. 2 illustrates the control device 4 of the SVC 1 illustrated in FIG. 1 in some more detail. The voltage $V_{SVC}$ measured at some point in the power network 2 and a set reference voltage $V_{ref}$ are both supplied to a difference-forming device 6, which calculates the difference $\Delta V$ between the input signals. The voltage $V_{SVC}$ is preferably low-pass filtered in a low-pass filter device 7 and possibly otherwise processed before input to the difference-forming device 6. This difference, or error signal, is input to a gain-adjusting device 12, to be described more in detail later. The output from the gain-adjusting device 12 is input to a voltage regulator 11, denoted PI-regulator in the following and being surrounded in FIG. 2 by solid lines.

The PI-regulator 11 comprises a proportional gain device 8 and an integral gain device 9. In conventional manner, the integral gain device computes the integral of the difference $\Delta V$ and multiplies it with an integral gain $K_2$ and inputs the result to a summing device 10, also part of the PI-regulator 11. The proportional gain device 8 computes the product of a proportional gain constant $K_1$ and the difference $\Delta V$. The output from the summing device 10 is thus the proportional gain $K_1$ times the magnitude of $\Delta V$ plus the integral gain $K_2$ times the integral of $\Delta V$. The output from the summing device 10 is denoted $B_{ref}$ and constitutes a control signal to the SVC 1, whereupon the SVC 1, by means of the device 5 for altering the SVC 1 admittance, accordingly varies the susceptance to the power network 2, as described earlier.

A network gain 13 is also illustrated in FIG. 2 and represents the network response to the susceptance input thereto, the suceptance input being based on the control signal $B_{ref}$. In particular, the actual power network 2 response $V_{SVC}$ to this input susceptance is determined by the power network impedance $Z_{net}$. $V_{SVC}$, the voltage at the point of common connection (pcc) for the power network 2 and the SVC 1, is thus given by the multiplication of the SVC 1 susceptance $B_{SVC}$ and power network gain. As illustrated in FIG. 2, a representative voltage $V_{net}$ of the power network is then added to this network response to a change in susceptance. The regulator function of the control device 4 is repeated until $\Delta V$ equals zero, i.e. until there is no difference, or sufficiently small difference, between the set reference voltage $V_{ref}$ and the measured voltage $V_{SVC}$.

The determination also takes into account some time delays occurring due to switching times of thyristors etc., which in the figure is illustrated by a box 15 and time delay function $e^{-sT}$. In particular, the illustrated pure time delay represents the delays due to waiting times for the correct point of waves for firing the thyristors. The output of the element 15 is the actual SVC susceptance.

The relationship between the network gain 13 and the gain adjustment device 12 will be described more in detail later. Briefly, the power network response to the input susceptance is modelled by a more accurate equation (equation 8), and the gain adjustment device 12 adjusts the control device gain in dependence thereon (adjustment defined in equation 9).

The control device 4 may comprise further steps conventionally performed, but not described above. For example, the transformations between different reference systems, a particular example being the transformation of measured three-phase voltages into rotating two-phase reference system and voltage sequence derivation. The measured voltage is conventionally supplied to the difference-forming device 6 after being processed mathematically, e.g. an absolute value of the positive sequence voltage being calculated. Further, the output $B_{ref}$ from the summing device 10 is preferably processed in known manner for providing triggering orders to the thyristor valves and other components of the SVC 1. All these examples can be executed in accordance with the prior art and is not part of the invention.

The control device 4 may be implemented as software executed on a processing means, such as a computer or microprocessor.

Figure 3:
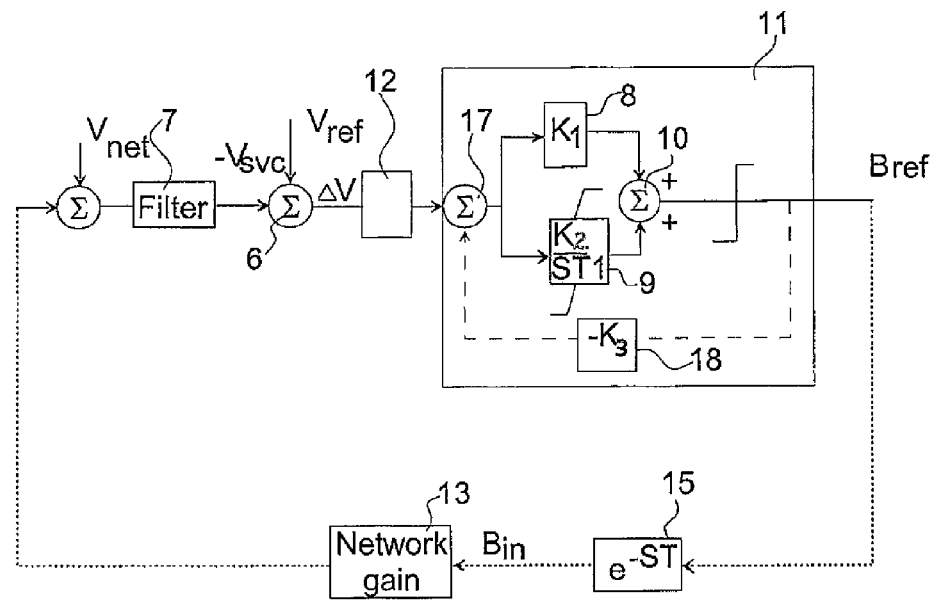
FIG. 3 illustrates the control device of the SVC of FIG. 2 with a feature added.

FIG. 3 illustrates an additional feature of the control device 4 of FIG. 2. From a control-engineering point of view, it is beneficial if the network reactance $X_{net}$, or equivalently the susceptance $B_{net}$, varies reasonably much, and preferably as little as possible. FIG. 3 illustrates one way of having the reactance $X_{net}$ appearing to be less varying. In particular, a fictitious reactance $X_{fictious}$ is added to the actual network reactance $X_{net}$. By choosing $X_{fictious}$ suitably, and specifically large enough, the sum $X_{fictious}+X_{net}$ appears to vary less than $X_{net}$. The above-described control device 4 is then provided with an additional feedback, illustrated by $K_3$ and reference numeral 18, for handling the fictitious reactance $X_{fictious}$. The output from the PI-regulator 11 is supplied to a difference-forming device 17 together with the output from gain adjustment device 12. The output from the difference-forming device 17 is input to the PI-regulator 11. The fictitious reactance $X_{fictious}$ is thereby easily handled by a few additional processing operations.

It is noted that in order to have a stable and fast control performance of the PI-regulator 11, it is necessary to have a constant total gain, i.e. power network gain*PI-regulator gain=constant. The invention provides a way of accomplishing this.

Figure 4:
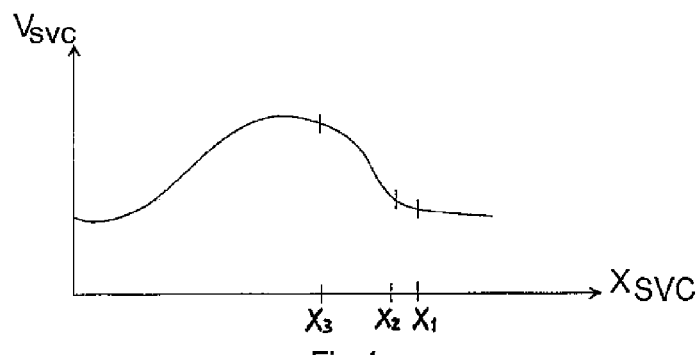
FIG. 4 illustrates changing requirements put on an SVC.
Figure 5:
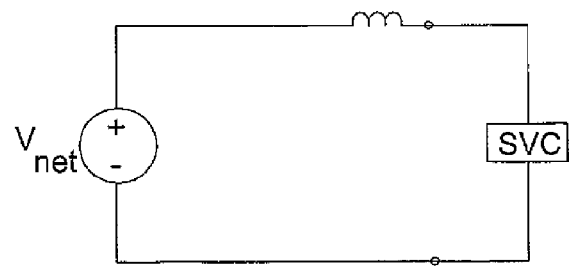
FIG. 5 illustrates a network seen as a Thevenin equivalent.

With reference now to FIGS. 4 and 5, the function of the network gain 13 is described more in detail in the following.

Generally, the SVC 1 can be seen, from a fundamental frequency point of view, as a variable admittance $Y_{SVC}$, see FIG. 5. Its effect on the power network voltage $V_{SVC}$ is directly the voltage share between the power network impedance $Z_{net}$, seen as a Thevenin equivalent, and the SVC admittance $Y_{SVC}$. It can be expressed by the equation $$V_{SVC} = \frac{Z_{SVC}}{(Z_{net} + Z_{SVC})} V_{net} = \frac{1}{(1 + Z_{net} * Y_{SVC})} V_{net} \quad \text{(eq 1)}$$

where $V_{SVC}$ is the voltage at the terminals of the SVC,
$V_{net}$ is the power network voltage seen as a Thevenin equivalent,
$Y_{SVC}$ is the SVC admittance,
$Z_{SVC}$ is the SVC impedance, and
$Z_{net}$ is the power network impedance as seen in a Thevenin equivalent.

The network gain can now be calculated as:

$$\frac{dV_{SVC}}{dY_{SVC}} = \frac{Z_{net}}{(1 + Z_{net} * Y_{SVC})^2} V_{net} \quad \text{(eq 2)}$$

where $Y_{SVC}$ is the SVC admittance.

This is a non-linear relation between the power network voltage sensitivity and the SVC admittance $Y_{SVC}$. From the above equation (2) it can be seen that the voltage sensitivity to the change in $Y_{SVC}$ increases significantly when the term $Z_{SVC}*Y_{SVC}$ increases.

When the SVC 1 rating is small compared to the power network 2 short circuit capacity, the product $Z_{SVC}*Y_{SVC}$ can be neglected, and the SCV gain $dV_{SVC}/dY_{SVC}$ can be seen as a constant. As mentioned, for the prior art SVC installations having a product $Z_{SVC}*Y_{SVC}$ not exceeding 0.1, the voltage sensitivity can be assumed constant and thereby totally determined by the power network impedance $Z_{net}$. However, as also mentioned earlier, recently some SVCs have become larger and then this assumption is no longer valid.

FIG. 4 illustrates the above described. In particular, the network voltage $V_{SVC}$ is illustrated as a function of the provided SVC reactance $X_{SVC}$. Prior art SVCs having ratings lying between $X_2$ and $X_1$ have a comparatively constant slope, which, in line with the above, is equivalent of saying that the voltage response to a change in SVC reactance $X_{SVC}$ can be considered constant. However, for an SVC having a rating lying between $X_3$ and $X_1$ the assumption of constant voltage sensitivity no longer holds.

The inventor of the present invention has foreseen possible problems that may occur due to the above. For example, in a power network the response time should be as fast as possible, for example 40 ms in a strong power network. In case the control device is tuned to this speed for a small step, close to the inductive limit in the strong system, it becomes unstable for a step at its capacitive limit in a weak power network.

As mentioned, FIG. 5 illustrates the Thevenin equivalent for the power network 2. The above equations (1) and (2) can be rewritten as (for simplicity, the reactance X is used instead of the impedance Z):

$$V_{SVC} = \frac{X_{SVC}}{X_{net} + X_{SVC}} V_{net} \quad \text{(eq 3)}$$

Ignoring the fact that $X_{SVC}$ can be negative or positive depending on whether the power network's reactive load is capacitive (leading) or inductive (lagging), and replacing the reactance $X_{SVC}$ with the equivalent susceptance $$\frac{1}{B_{SVC}}$$

we have:

$$V_{SVC} = \frac{\frac{1}{B_{SVC}}}{X_{net} + \frac{1}{B_{SVC}}} V_{net} = \frac{1}{X_{net}B_{SVC} + 1} V_{net} \quad \text{(eq 4)}$$

The gain of the SVC 1 is then:

$$\frac{dV_{SVC}}{dB_{SVC}} = \frac{X_{net}}{(1 + X_{net}B_{SVC})^2} V_{net} \quad \text{(eq 5)}$$

For the earlier described prior art SVCs, it could be assumed that $B_{SVC} \ll X_{net}$. Then:

$$\begin{aligned}\frac{dV_{SVC}}{dB_{SVC}} &= \frac{X_{net}}{(1 + X_{net}B_{SVC})^2} V_{net} \quad \text{(eq 6)} \\ &= \{B_{SVC} \ll X_{net}\} \\ &= \frac{X_{net}}{(1 + \varepsilon)^2} V_{net} \\ &\approx X_{net} V_{net}\end{aligned}$$

wherein the term $X_{net}B_{SVC} = \varepsilon$ is close to zero and has therefore been neglected in the prior art.

Thus, the gain of the prior art SVC is $$\Delta V_{SVC} \approx X_{net} \Delta B_{SVC} V_{net} \quad \text{(eq 7)}$$

However, as described earlier, the assumption of $B_{SVC} \ll X_{net}$ becomes invalid when $B_{SVC}$ becomes large, which as an example, could be approximately when $B_{SVC} > 10\%$ of $X_{net}$. This can also be expressed as SVC ratings becoming large in comparison to the power network short circuit power.

For such SVC ratings, the point of operation $B_{SVC}$, also denoted working point, of the SVC 1 can no longer be neglected. When $B_{SVC} < X_{net}$ we have:

$$\frac{dV_{SVC}}{dB_{SVC}} = \frac{X_{net}}{(1 + X_{net}B_{SVC})^2} V_{net} \quad \text{(eq 8)}$$

In accordance with the invention, the earlier neglected term $X_{net}B_{SVC}$ is taken into considering in regulation scheme of the control device 4. Thereby a more accurate control is obtained, whereby the foreseen problems are at least alleviated or even eliminated.

In particular, the voltage sensitivity is, in contrast to prior art solutions, not considered as a constant, but as varying in dependence on the point of operation of the SVC.

The network gain is taken into account in the control device 4, and more specifically in the gain-adjusting device 12. In accordance with the invention, the PI-regulator 11 gain is multiplied with the network gain in every time step. That is, multiplied with the inverse of the denominator of equation (8) in every time step. The PI-regulator 11 gain is thus multiplied with:

$$(1 + X_{net}B_{SVC})^2 \qquad (\text{eq } 9)$$

Then:

$$\frac{dV_{SVC}}{dB_{SVC}} = \frac{X_{net}}{(1 + X_{net}B_{SVC})^2}(1 + X_{net}B_{SVC})^2 V_{net} \qquad (\text{eq } 10)$$

$$= X_{net}V_{net}$$

$$\Delta V_{SVC} = X_{net}V_{net}\Delta B_{SVC} \qquad (\text{eq } 11)$$

Thereby, the PI-regulator 11 gain multiplied with the power network gain can be considered to be constant irrespective of point of operation.

In the software implementation of the control device 4, the above equations may be implemented in conventional manner. For example, $\Delta V_{SVC}$ can be obtained from values of $V_{SVC}$ in successive regulation cycles, $V_{SVC}(m)$ and $V_{SVC}(m+1)$.

Figure 6A:
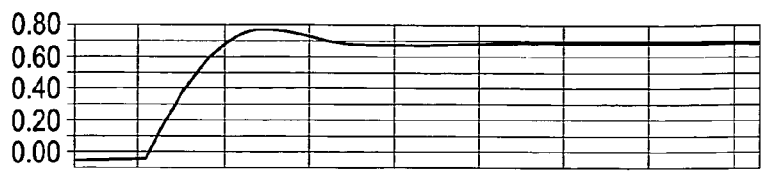
FIGS. 6a and 6b illustrate simulations results of a control device implementing the invention.
Figure 6A:
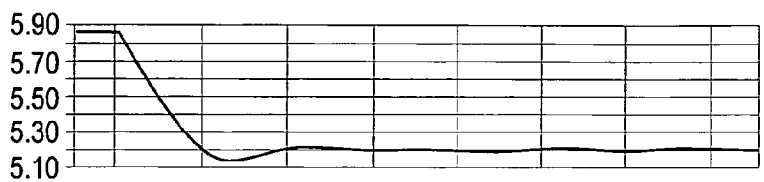
Figure 6B:
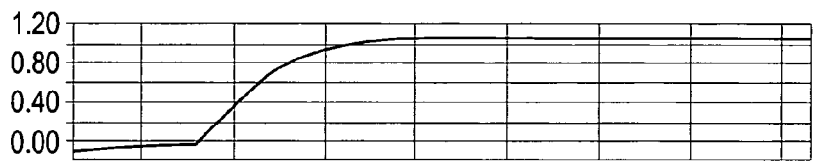
Figure 6B:
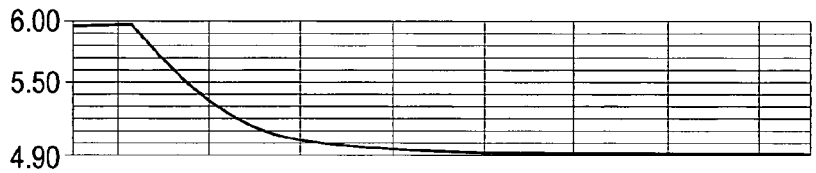

FIGS. 6a and 6b illustrate simulations results of a control device 4 in which the present invention is implemented. FIG. 6a illustrates a 2% voltage change in a weak power network. FIG. 6b illustrate a 2% voltage change in a strong power network. The figures thus show that an almost constant response is obtained in dependence on the power network strength (short circuit strength) and irrespective of SVC operating point ($B_{SVC}$) by means of the invention. If $X_{net}$ is measured and known, then the invention provides a way of providing a constant response also irrespective of power network strength.

In an alternative embodiment of the invention, and with reference again to FIG. 4, the function $V_{net}(X_{SVC})$ within the interval $X_3$ to $X_1$, i.e. within the working area of the SVC 1, may be divided into a number of piecewise linear functions. That is, within sub-intervals of the interval $X_3$ to $X_1$, the function is approximated to be linear. Each such linear function can then be approximated as being constant, in line with the prior art. Depending on point of operation of the SVC 1 a suitable linear function is used by the network gain 13. As above, the gain of the PI-regulator 11 is adjusted relative to the point of operation of the SVC.

The invention also provides methods for controlling a reactive power compensator, such as the SVC 1, connected to an electric power network 2 by means of the described control device 4. The SVC 1 is arranged to provide reactive power to the electric power network 2. The control device 4 comprises a voltage regulator, such as the PI-regulator 11, that outputs a control signal to the SVC 1 for controlling the supply of reactive power to or absorption of reactive power from the electric power network 2. The method comprises the step of adjusting, by means of a network gain calculating device 13 of the control device 4, a gain of the PI-regulator 11 relative to the point of operation of the SVC 1.

In particular, the step of adjusting the gain of the PI-regulator 11 comprises the multiplication of the gain of the SVC 1 with an adjustment term as defined in equation (9), i.e. by the expression $(1+X_{net}B_{SVC})^2$. In an embodiment, this is performed in every regulation cycle performed by the control device 4.

When implementing the method, the network gain is estimated by means of the equation:

$$\frac{dV_{SVC}}{dB_{SVC}} = \frac{X_{net}}{(1 + X_{net}B_{SVC})^2}V_{net} \qquad (\text{eq } 8)$$

wherein
$X_{net}$, $V_{net}$, $V_{SVC}$ and $B_{SVC}$ are as described earlier.

Further, the gain of the voltage regulator 11 is adjusted, in the gain-adjusting device 12, by multiplying the above equation (8) with $(1+X_{net}B_{SVC})^2$.

In conventional manner, the method aims at eliminating any differences between a voltage $V_{SVC}$ sensed in the electric power network 2 and a set reference voltage $V_{ref}$ and is thus repeated until sufficient accuracy is obtained.

The invention also provides a reactive power compensator, such as the SVC 1, comprising a control device 4 as described.

Figure 7:
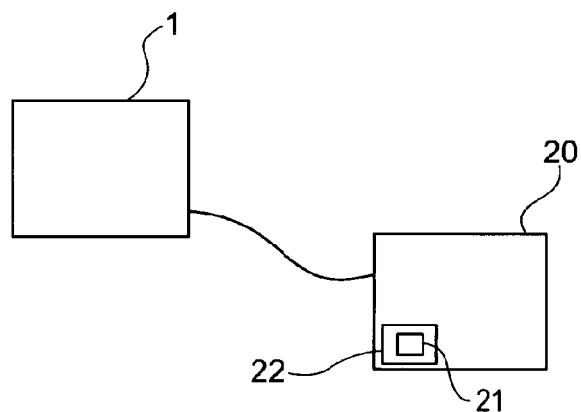
FIG. 7 illustrates a computer controlling the SVC of FIG. 1.

Further yet, with reference to FIG. 7, the invention provides a computer program product 21 loadable into the internal memory of a computer 20 that controls a reactive power compensator, such as the SVC 1. The computer program product 21 comprises software code portions for carrying out the method as described above, when it is run on the computer 20. The computer program product 21 can be stored on a computer readable storage medium 22, comprising computer readable program code means for causing the computer 20 of the SVC 1 to carry out the method as described.

In summary, the present invention is based on the realization that regulation problems of an SVC may be encountered as the rating of the SVC increases. When the SVC becomes large, the slope reactance becomes smaller than one third of the power network and it starts to become insignificant for the stability of the SVC regulator. Further, the assumption that the network gain is constant becomes invalid. The combination SVC and power network acts more and more like a series resonance circuit. In accordance with the invention, the voltage regulator gain is multiplied, in every time step, with an adjustment term derived from an equation for the network gain. Thereby a control device having a constant control speed is obtained irrespective of point of operation of the SVC and irrespective of the power network strength.

What is claimed is:

1. A control device for controlling a reactive power compensator connected to an electric power network and arranged to provide reactive power to said electric power network, said control device comprising a voltage regulator outputting a control signal to said reactive power compensator for controlling its susceptance to said electric power network, characterized in that said control device comprises a gain-adjusting device arranged to adjust the gain of said voltage regulator relative to the point of operation of said reactive power compensator by multiplying the gain of the reactive power compensator with an adjustment term equalling $(1+X_{net} B_{svc})^2$, wherein $X_{net}$ is the reactance of the electric power network seen as a Thevenin equivalent and $B_{svc}$ is the susceptance of the reactive power compensator.

2. The control device of claim 1, wherein said gain-adjusting device is arranged to adjust the gain of said voltage regulator by multiplying said gain of said reactive power compensator with said adjustment term in every regulation cycle performed by said control device.

3. The control device as of claim 2, wherein said gain of said electric power network is calculated by means of the equation:

$$\frac{dV_{SVC}}{dB_{SVC}} = \frac{X_{net}}{(1 + X_{net}B_{SVC})^2}V_{net}$$

wherein
$X_{net}$ is the reactance of said electric power network seen as a Thevenin equivalent, $V_{net}$ is the power network voltage seen as a Thevenin equivalent, $V_{svc}$ is a voltage at the terminals of said reactive power compensator, and $B_{svc}$ is the susceptance of said reactive power compensator.

4. The control device of claim 1, wherein said voltage regulator comprises means for handling a fictitious reactance added to an actual network reactance, whereby the network reactance appears to be less varying.

5. A reactive power compensator comprising a control device of claim 1.

6. A method for controlling, by means of a control device, a reactive power compensator connected to an electric power network and arranged to provide reactive power to said electric power network, said control device comprising a voltage regulator outputting a control signal to said reactive power compensator for controlling its supply of susceptance to said electric power network, characterized by the steps of:

adjusting, by means of a gain-adjusting device of said control device, a gain of said voltage regulator relative to the point of operation of said reactive power compensator, by multiplying the gain of the reactive power compensator with an adjustment term equalling $(1+X_{net}B_{svc})^2$, wherein $X_{net}$ is the reactance of the electric power network seen as a Thevenin equivalent and $B_{svc}$ is the susceptance of the reactive power compensator.

7. The method of claim 6, wherein said gain of said voltage regulator is adjusted by multiplying said gain of said reactive power compensator with said adjustment term in every regulation cycle performed by said control device.

8. The method of claim 6, wherein said gain of said electric power network is calculated by means of the equation:

$$\frac{dV_{SVC}}{dB_{SVC}} = \frac{X_{net}}{(1+X_{net}B_{SVC})^2} V_{net}$$

wherein $X_{net}$ is the reactance of said electric power network seen as a Thevenin equivalent, $V_{net}$ is a voltage of said electric power network seen as a Thevenin equivalent, $V_{svc}$ is a voltage at the terminals of said reactive power compensator, and $B_{svc}$ is the susceptance of said reactive power compensator.

9. A computer program product loadable into the internal memory of a computer controlling a reactive power compensator, comprising software code portions for carrying out the method of claim 6 when said product is run on said computer.

10. A computer program product stored on a computer readable storage medium, comprising computer readable program code means for causing a computer of a reactive power compensator to carry out the method of claim 6.

* * * * *